US00RE49638E

(19) United States
(12) Reissued Patent
Baker et al.

(10) Patent Number: US RE49,638 E
(45) Date of Reissued Patent: Sep. 5, 2023

(54) DISPLAY SCREEN OR PORTION THEREOF WITH GRAPHICAL USER INTERFACE

(71) Applicant: Lutron Technology Company LLC, Coopersburg, PA (US)

(72) Inventors: Rhodes B. Baker, Bethlehem, PA (US); Erica L. Clymer, Northampton, PA (US); Benjamin F. Bard, Zionsville, PA (US)

(73) Assignee: Lutron Technology Company LLC, Coopersburg, PA (US)

(21) Appl. No.: 29/852,644

(22) Filed: Sep. 8, 2022

Related U.S. Patent Documents

Reissue of:

(64) Patent No.: Des. 772,910
Issued: Nov. 29, 2016
Appl. No.: 29/519,785
Filed: Mar. 8, 2015

U.S. Applications:

(63) Continuation of application No. 29/778,455, filed on Apr. 13, 2021, which is a continuation of application No. 29/671,750, filed on Nov. 29, 2018, now Pat. No. Re. 48,567, which is an application for the reissue of Pat. No. Des. 772,910.

(51) LOC (14) Cl. ..... 14-04

(52) U.S. Cl.
USPC ..... D14/486

(58) Field of Classification Search
USPC ..... D14/485–495; D18/26, 31, 32, 33; D20/11, 12, 23, 24, 25, 29, 30, 31, 32, D20/36, 37, 38
CPC ..... G06F 3/048; G06F 3/0481; G06F 3/0482; G06F 3/04817; G06F 3/04812
See application file for complete search history.

(56) References Cited

U.S. PATENT DOCUMENTS

| | | | | | |
|---|---|---|---|---|---|
| D429,252 | S | | 8/2000 | Haitani et al. | |
| 6,100,659 | A | | 8/2000 | Will et al. | |
| D546,779 | S | * | 7/2007 | Mierta | D13/164 |
| D592,225 | S | * | 5/2009 | Blankenship | D14/492 |
| 7,587,683 | B2 | * | 9/2009 | Ito | H04M 1/72469 715/857 |
| D611,950 | S | * | 3/2010 | Fletcher | D14/488 |
| D624,556 | S | * | 9/2010 | Chaudhri | D14/486 |
| D640,267 | S | | 6/2011 | Jones et al. | |
| D649,125 | S | * | 11/2011 | Clymer | D13/174 |
| D659,158 | S | * | 5/2012 | Clymer | D14/488 |
| D660,310 | S | * | 5/2012 | Kim | D14/486 |

(Continued)

OTHER PUBLICATIONS

Lutron Electronics Co., Inc., Icons from Caseta (Q2 2014) App, available at least as early as Jun. 23, 2015.

(Continued)

*Primary Examiner* — Darlington Ly
(74) *Attorney, Agent, or Firm* — Saidman DesignLaw Group, LLC

(57) CLAIM

The ornamental design for a display screen or portion thereof with graphical user interface, as shown and described.

DESCRIPTION

The sole FIGURE is a display screen or portion thereof with graphical user interface showing our new design.

(Continued)

The peripheral dashed broken lines represent a display screen or portion thereof which forms no part of the claimed design.

1 Claim, 1 Drawing Sheet

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D687,050 | S | * | 7/2013 | Matas | D14/486 |
| D689,093 | S | | 9/2013 | Nagaoka et al. | |
| 8,525,839 | B2 | | 9/2013 | Chaudhri | |
| D695,313 | S | | 12/2013 | Jang et al. | |
| D695,758 | S | * | 12/2013 | Tagliabue | D14/486 |
| D696,272 | S | * | 12/2013 | Tagliabue | D14/486 |
| D701,867 | S | | 4/2014 | Thompson et al. | |
| D702,700 | S | * | 4/2014 | Thompson | D14/492 |
| 8,780,201 | B1 | * | 7/2014 | Scalisi | H04N 7/186 348/143 |
| 8,866,343 | B2 | * | 10/2014 | Abraham | H04L 12/413 307/85 |
| D737,283 | S | * | 8/2015 | Scalisi | D14/485 |
| D746,849 | S | * | 1/2016 | Anzures | D14/486 |
| D748,645 | S | | 2/2016 | Kim et al. | |
| D750,106 | S | | 2/2016 | Capela et al. | |
| D753,706 | S | | 4/2016 | Xiong | |
| D757,802 | S | * | 5/2016 | Kim | D14/491 |
| D760,737 | S | * | 7/2016 | Yoon | D14/485 |
| D761,292 | S | * | 7/2016 | Wiesner | D14/486 |
| 9,384,491 | B1 | * | 7/2016 | Briggs | H04W 4/44 |
| D766,289 | S | | 9/2016 | Bauer et al. | |
| D772,921 | S | | 11/2016 | Jewitt et al. | |
| D773,485 | S | | 12/2016 | Cho et al. | |
| D780,793 | S | * | 3/2017 | Lemay | D14/486 |
| D783,631 | S | | 4/2017 | Inose et al. | |
| D783,634 | S | | 4/2017 | Rounis | |
| D794,669 | S | | 8/2017 | Baker et al. | |
| D795,918 | S | | 8/2017 | Bischoff et al. | |
| D795,926 | S | | 8/2017 | Bischoff et al. | |
| D800,740 | S | | 10/2017 | Clymer et al. | |
| D801,365 | S | * | 10/2017 | Broughton | D14/486 |
| D802,013 | S | * | 11/2017 | Kluge | D14/488 |
| D804,524 | S | | 12/2017 | Zin et al. | |
| D809,560 | S | | 2/2018 | Alfonzo et al. | |
| D830,409 | S | * | 10/2018 | Agarwal | D14/488 |
| D838,290 | S | | 1/2019 | Clymer et al. | |
| D847,174 | S | * | 4/2019 | Agarwal | D14/486 |
| D849,050 | S | | 5/2019 | Clymer et al. | |
| D854,036 | S | * | 7/2019 | Agarwal | D14/486 |
| D866,588 | S | * | 11/2019 | Agarwal | D14/492 |
| D873,847 | S | * | 1/2020 | Clymer | D14/487 |
| D876,456 | S | * | 2/2020 | Broughton | D14/491 |
| D891,458 | S | | 7/2020 | Clymer | |
| 2010/0023865 | A1 | * | 1/2010 | Fulker | G08B 25/14 700/286 |
| 2011/0266122 | A1 | | 11/2011 | Zaharchuk et al. | H01H 9/18 200/308 |
| 2012/0095601 | A1 | | 4/2012 | Abraham et al. | |
| 2014/0236358 | A1 | | 8/2014 | Sasaki et al. | |
| 2014/0380234 | A1 | * | 12/2014 | Shim | H04W 4/08 715/781 |
| 2015/0033136 | A1 | * | 1/2015 | Sasaki | H04L 41/22 715/736 |
| 2015/0188724 | A1 | * | 7/2015 | Kim | H04N 7/181 340/3.71 |
| 2015/0286388 | A1 | * | 10/2015 | Jeon | G06F 3/04847 715/736 |
| 2016/0092959 | A1 | | 3/2016 | Gross | |
| 2016/0262235 | A1 | | 9/2016 | Clymer et al. | |
| 2020/0077483 | A1 | | 3/2020 | Agarwal et al. | |

OTHER PUBLICATIONS

Lutron Electronics Co., Inc., Icons from Saltmarsh/ myOrders (Q4 2015-Q3 2016) App, available at least as early as Jun. 23, 2015.

Lutron Electronics Co., Inc., Icons from Lutron Connect (Apr. 2016) App, available at least as early as Jun. 23, 2015.

Michael Brown, Lutron's Caseta lighting controls are now (mostly) compatible with Apple's HomeKit, dated Jun. 2, 2015, TechHive.com [online], [retrieved Feb. 6, 2017]. Available from Internet: <URL: http://www.techhive.com/article/2929733/lutrons-caseta-lighting-controls-are-now-mostly-compatible-with-apples-homekit.html>.

Home Automation Smart Home Icon Set, dated Jul. 25, 2014, graphicriver.net [online], [retrieved Sep. 29, 2018]. Available from Internet: <URL: https://graphicriver.net/item/home-automation-smart-home-icon-set/8389579>.

Grant Clauser, Lutron's New Smart Bridge Pro Makes Lutron Lighting Easier to Integrate, dated Apr. 8, 2014, electronichouse.com [online], [retrieved Feb. 16, 2018]. Available from Internet: <URL: https://www.electronichouse.com/home-lighting/>.

Blue Link, dated Nov. 6, 2017, neosmartblinds.com [online]. Retrieved Aug. 31, 2020 from Internet <URL: https://web.archive.org/web/20171106121500/http://neosmartblinds.com/bluelink/> (Year: 2017).

Lutron Electronics Co., Inc., Icons from HomeControl+ (Q3 2014) App, available at least as early as Aug. 4, 2015.

Lutron Electronics Co., Inc., Icons from Quantum Vue (Q1 2014) App, available at least as early as Aug. 4, 2015.

Lutron Electronics Co., Inc., Icons from Apple Watch (Q3 2014) App, available at least as early as Aug. 4, 2015.

Lutron Electronics Co., Inc., Icons from Vive (Q3 2016) App, available at least as early as Aug. 4, 2015.

Lutron Technical Support, RadioRA2—Lutron Home Control+ App for the Apple iPad, iPhone, and iPod touch, Lutron Home Control+ App for Android, Revision I, available at least as early as 2011.

U.S. Appl. No. 29/735,507, filed May 21, 2020 (unpublished).

Crestron Electronics Inc., Crestron Mobile E-Control Mobility Solution, available at least as early as Mar. 2009.

Crestron Electronics Inc., Prodigy System User Guide, available at least as early as Mar. 8, 2015.

Crestron Electronics Inc., Prodigy System User Guide Crestron $PTX_3$, available at least as early as Mar. 8, 2015.

Julie Jacobson, CEPro $Control_4$ InfinityEdge Priced, Designed Like iPad, < http://www.cepro.com/article/control4_infinityedge_priced_designed_like_ipad/ >, available on Aug. 10, 2010.

Lutron Technical Support, $RadioRA_2$—Lutron Home Control+ App for the Apple iPad, iPhone, and iPod touch, Revision F, available at least as early as Mar. 8, 2015.

Lutron Electronics Co., Inc., Quantum Green Glance Brochure, available at least as early as Nov. 2007.

Home Automation, Inc., OmniTouch 5.7 Touchscreen with Video User's Guide, available at least as early as Jun. 2007.

Crestron Electronics Inc., Prodigy Brochure, available at least as early as Mar. 8, 2015.

* cited by examiner

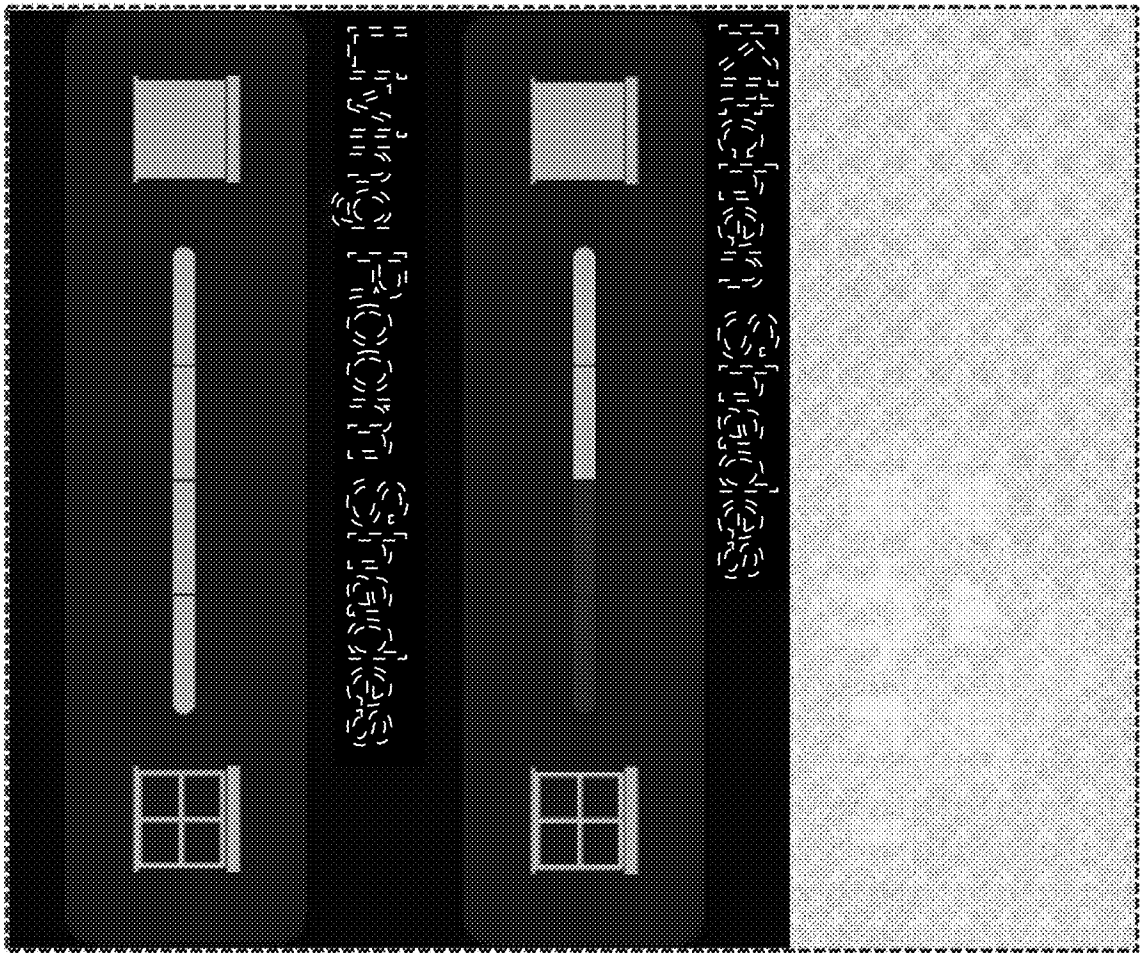
*(NEW)*